United States Patent
Halfmann et al.

(10) Patent No.: US 8,165,239 B2
(45) Date of Patent: Apr. 24, 2012

(54) METHOD FOR CODING DATA SYMBOLS

(75) Inventors: Rüdiger Halfmann, Otterberg (DE);
Cornelius Heckrott, Hamburg (DE);
Martin Weckerle, Ulm (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 754 days.

(21) Appl. No.: 12/223,032

(22) PCT Filed: Dec. 15, 2006

(86) PCT No.: PCT/EP2006/069746
§ 371 (c)(1),
(2), (4) Date: Jan. 14, 2009

(87) PCT Pub. No.: WO2007/082614
PCT Pub. Date: Jul. 26, 2007

(65) Prior Publication Data
US 2009/0220027 A1    Sep. 3, 2009

(30) Foreign Application Priority Data
Jan. 19, 2006    (DE) .......................... 10 2006 002 696

(51) Int. Cl.
*H04B 7/02*    (2006.01)
(52) U.S. Cl. ........ 375/267; 375/260; 375/299; 375/347; 375/349
(58) Field of Classification Search .................. 375/267, 375/260, 299, 347, 349
See application file for complete search history.

(56) References Cited

U.S. PATENT DOCUMENTS
2003/0072395 A1 * 4/2003 Jia et al. .................... 375/341

FOREIGN PATENT DOCUMENTS
WO    2004/073275 A1    8/2004

OTHER PUBLICATIONS

V. Tarokh, "A Differential Detection Scheme for Transmit Diversity"; IEEE Journal on Selected Areas In Communications, vol. 18, No. 7, Jul. 2000; pp. 1169-1174.
G. Bausch, "Differential Space-Time-Frequency Transmit Diversity in OFDM"; Proceedings of International Symposium on Wireless Personal Multimedia Communication; Oct. 19, 2003; 5 pp.
Q. Ma, et al.; "Full Diversity Block Diagonal Codes for Differential Codes for Differential Space-Time-Frequency Coded OFDM"; IEEE Global Telecommunications Conference, vol. 2; 2003; pp. 868-872.
H. Li; "Differential Space-Time Modulation with Maximum Spatio-Spectral Diversity"; IEEE Int'l Conference on Communications, vol. 4; 2003; pp. 2588-2592.
International Search Report for Application No. PCT/EP2006/069746; mailed Jun. 12, 2007.

* cited by examiner

*Primary Examiner* — Kabir A Timory
(74) *Attorney, Agent, or Firm* — Staas & Halsey LLP

(57)    ABSTRACT

Data symbols, transmitted by OFDM radio using at least two transmission antennae, are coded by a DSTBC coding and a DSTFBC coding. Two adjacent data symbols of a selected sub-carrier are provided for initializing a DSTFBC coding in a sub-carrier direction and are used for DSTFBC coding of similarly positioned data symbols in further sub-carriers in the sub-carrier. The DSTFBC coding is carried out from the data symbols of the first sub-carrier direction. In each sub-carrier the two data symbols formed by DSTFBC coding are used for initializing a DSTBC coding in the OFDM symbol direction. In the reverse direction, two sequential DSTBC coded data symbols on a first sub-carrier for initializing a DSTFBC coding in a sub-carrier direction and are used for DSTFBC coding of similarly positioned data symbols in further sub-carriers for DSTFBC coding from the data symbols of the first sub-carrier over the adjacent sub-carriers.

12 Claims, 7 Drawing Sheets

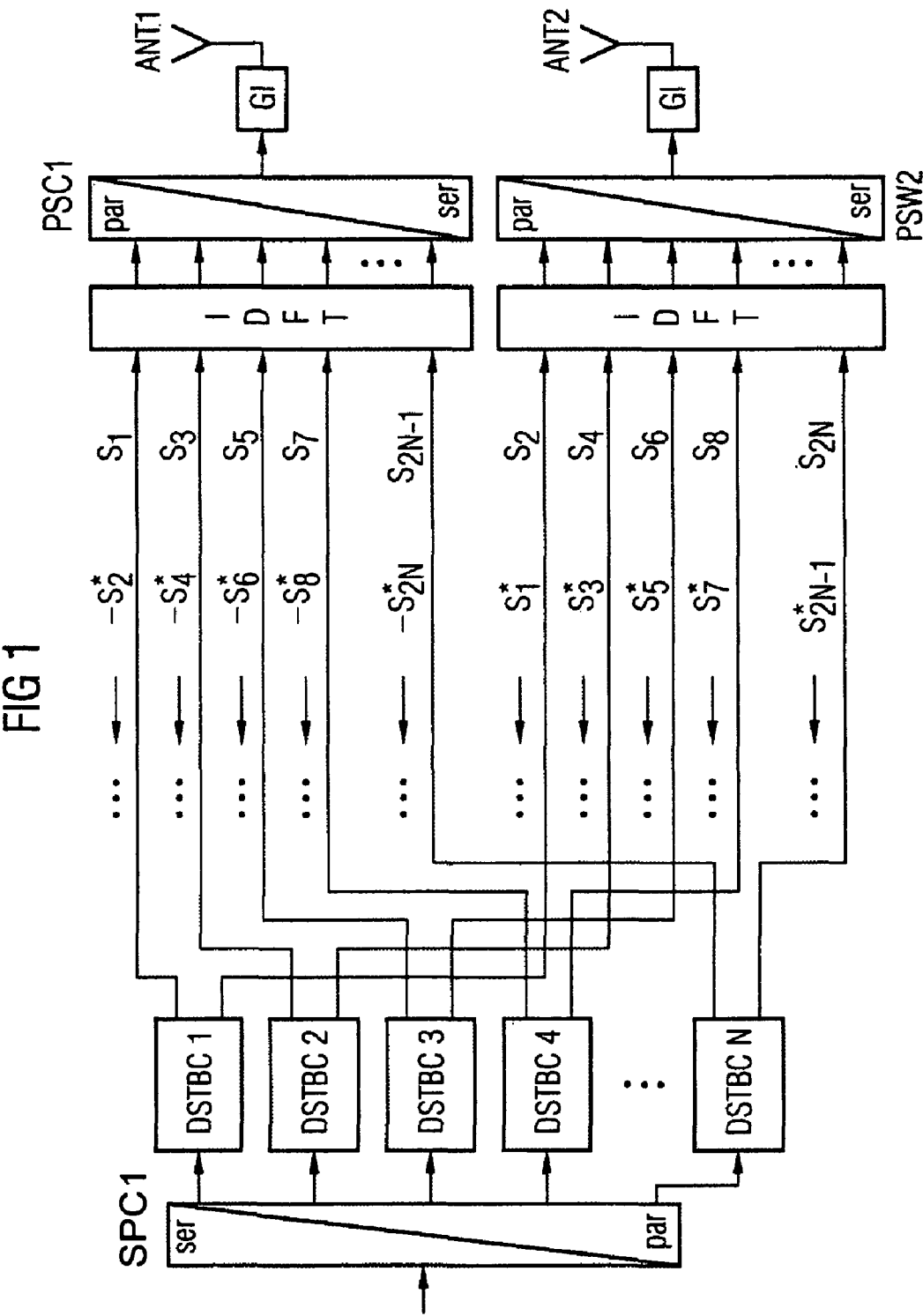

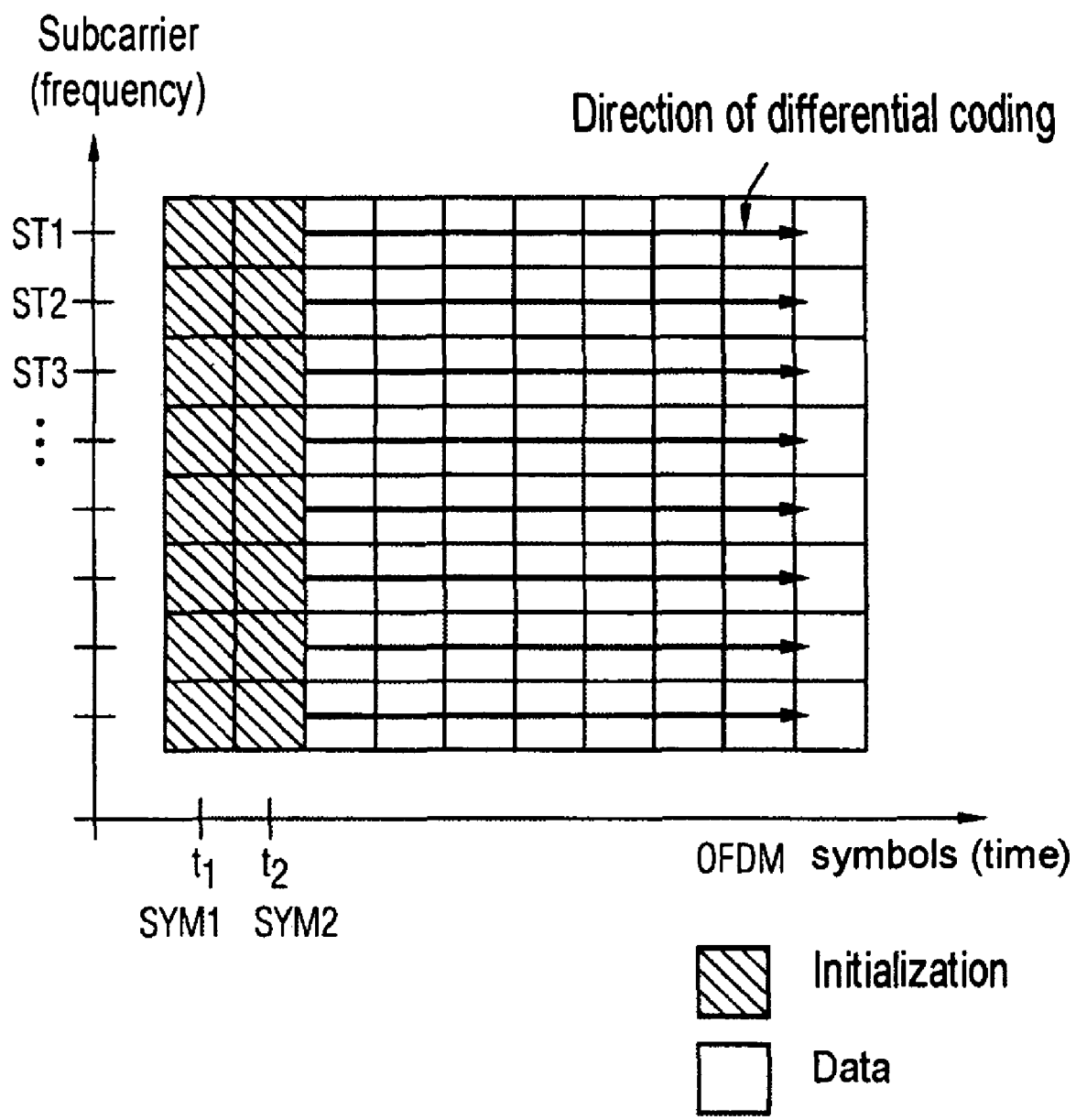

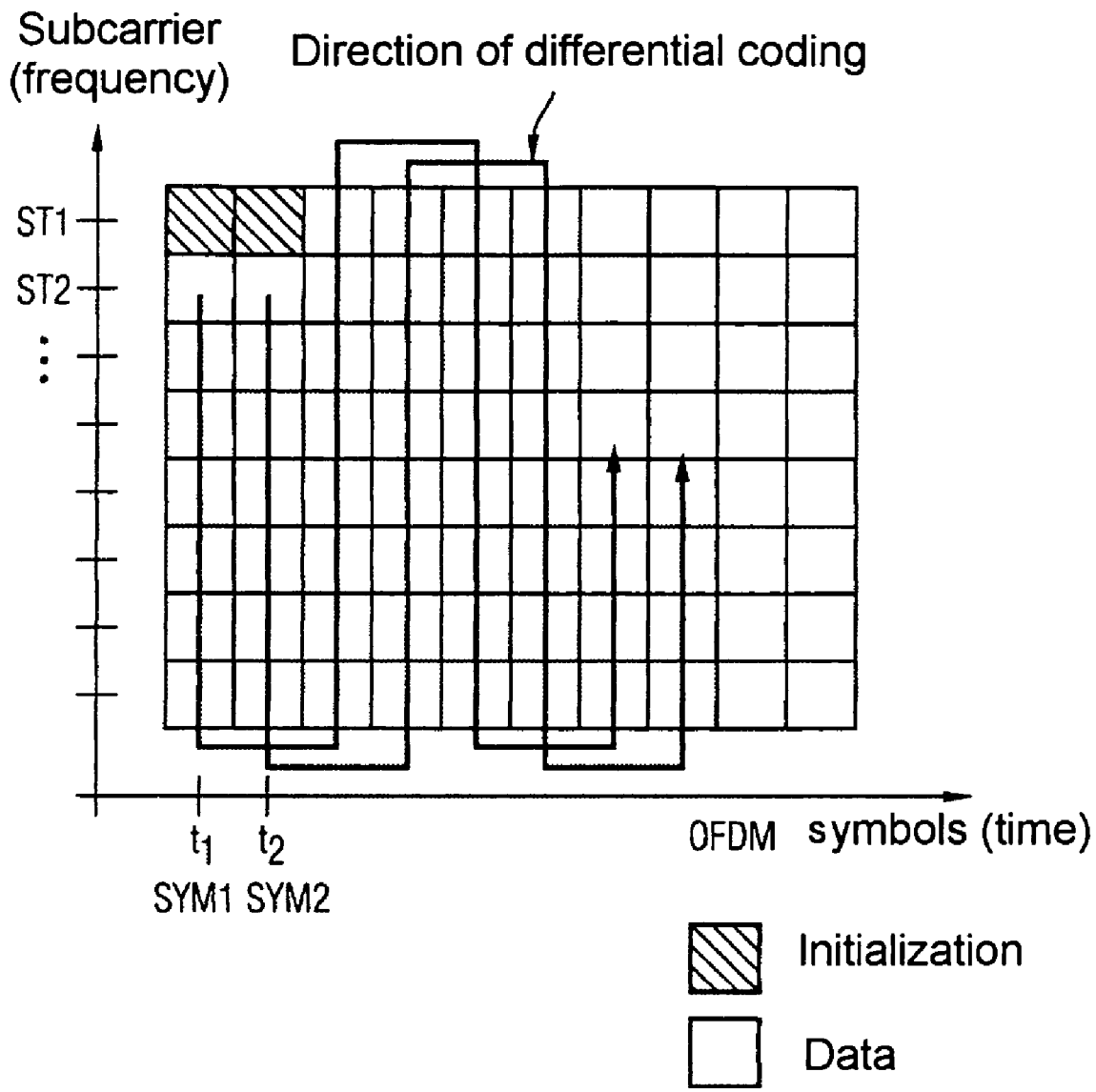

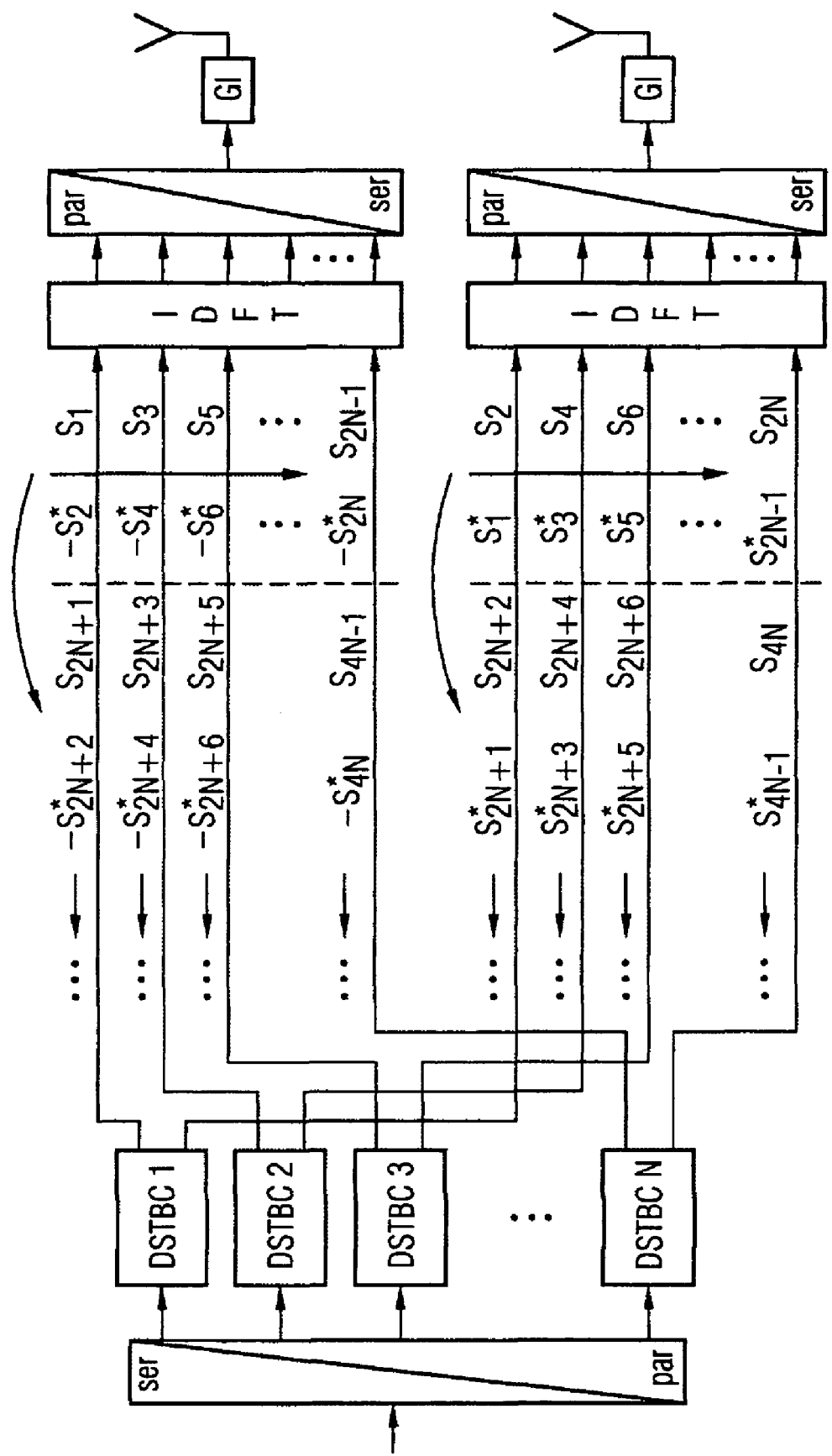

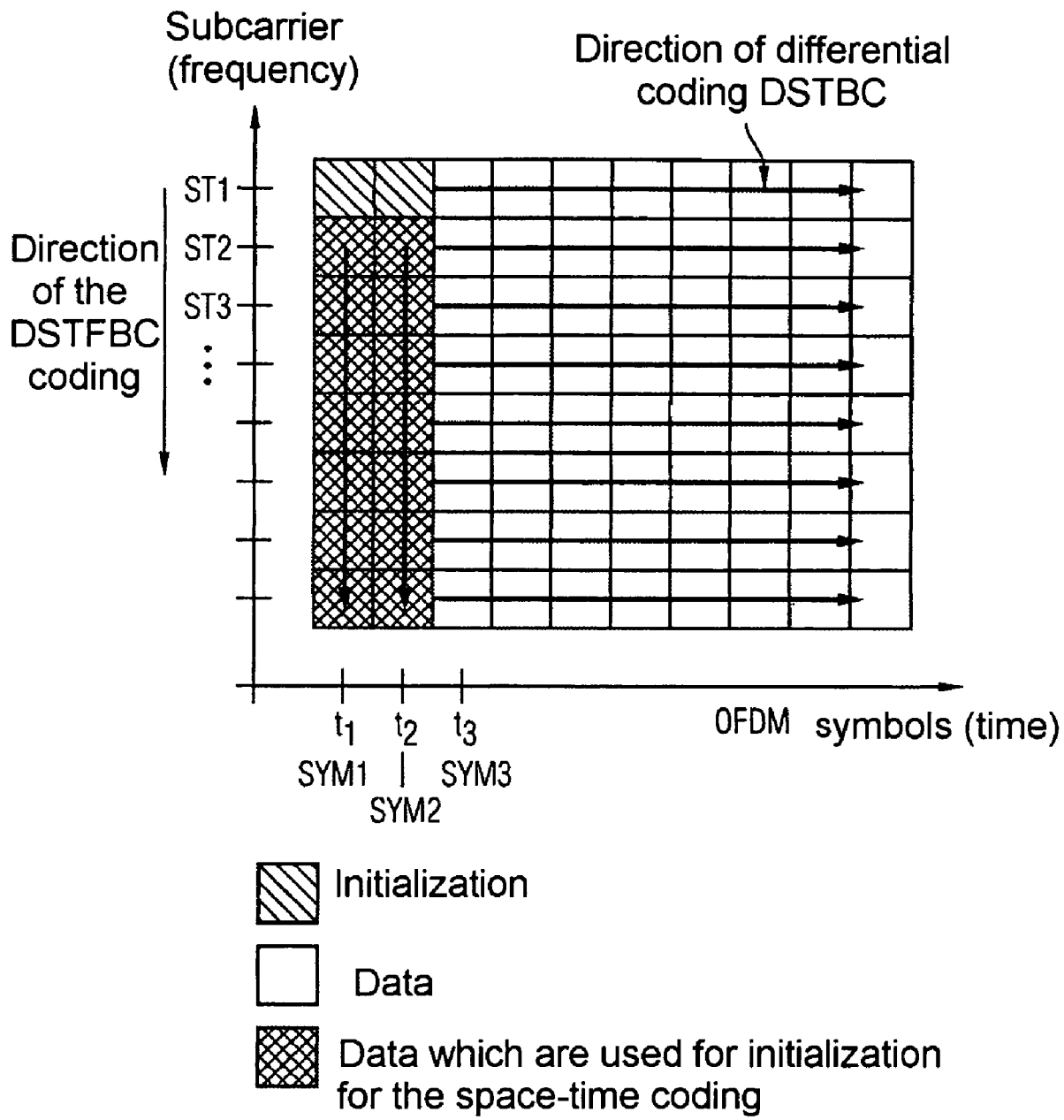

METHOD FOR CODING DATA SYMBOLS

CROSS REFERENCE TO RELATED APPLICATIONS

This application is based on and hereby claims priority to German Application No. 10 2006 002 696.9 filed on Jan. 19, 2006, the contents of which are hereby incorporated by reference.

BACKGROUND

Described below is a method for coding data symbols which are transmitted in an OFDM radio transmission via at least two transmitting antennas.

In future broadband radio communication systems, multi-carrier transmission methods will be used for transmissions with high data rates. The use of the familiar OFDM—orthogonal frequency division multiplex—transmission method in combination with multi-antenna systems, particularly with MIMO antenna systems, is particularly suitable.

Due to the multipath propagation of radio waves and due to time-dependent changes in the mobile radio channel characteristics, radio signals are distorted during the transmission. To be able to receive transmitted data free of distortion, it is known to use a so-called coherent detection at the receiver end. For this purpose, a radio channel used is measured at regular intervals with the aid of transmitted training sequences or pilot symbols which are previously known at the receiving end. By this, the receiver can determine current distortions of the radio channel via a channel estimation and equalize transmitted data again.

However, such a channel estimation has the following disadvantages:
- the transmission of the training sequences or pilot symbols, respectively, causes a considerable signaling overhead,
- during the transmission of the training sequences or pilot symbols, respectively, no (payload) data can be transmitted, and
- a complex, time-consuming algorithm must be used for channel estimation at the receiving end.

In a MIMO radio transmission system, the radio channel estimation can be carried out only with great time expenditure due to the large number of antennas since the number of necessary channel estimations is the result of the product of the number of antennas at the transmitting end and of the number of antennas at the receiving end.

In the case of fast changes in the environment which are experienced, for example, by a fast-moving mobile radio communication terminal, the channel conditions or channel characteristics also change rapidly. In this context, a so-called "coherence time", which is used as a measure of a time variance of the radio channel characteristics, is essentially defined by the speed of the mobile radio communication terminal.

Time intervals used for radio channel estimation must be clearly below the coherence time in order to achieve a current base for subsequent radio channel estimations. It generally holds true that at a higher speed of the terminal, correspondingly more frequent radio channel estimations must be carried out. Correspondingly frequently, training symbols must be sent instead of (payload) data which, in turn, leads to a decrease in the efficiency of the radio transmission system.

To avoid the radio channel estimation, the so-called "Differential Space Time Block Code, DSTBC", which is described, for example, in "A Differential Detection Scheme for Transmit Diversity", Tarokh, Jafarkhani, IEEE Journal on Selected Areas in Communications, Volume 18, No. 7, July 2000, has been defined for MIMO radio transmission systems.

In this context, information or data about a difference between a current signal and a previous signal are modulated. It is assumed that the radio channel essentially does not change within the time interval between two successive data symbols, i.e. the coherence time is greater by a multiple than the symbol duration. In this case, the two successive transmitted data symbols are subjected to approximately the same distortion (considered from an arbitrary time t0).

In other words, the difference between the two successive transmitted symbols is influenced only insignificantly by the distortion of the radio channel. The transmitted information can thus be recovered without additional channel equalization.

The differential coding for a MIMO radio communication system with two transmitting antennas can be described, for example, by the following matrix multiplication:

$$S_k = S_{k-1} \cdot C_k$$

$$\begin{bmatrix} s_{2k+1} & s_{2k+2} \\ -s_{2k+2}^* & s_{2k+1}^* \end{bmatrix} = \begin{bmatrix} s_{2k-1} & s_{2k} \\ -s_{2k}^* & s_{2k-1}^* \end{bmatrix} \cdot \begin{bmatrix} c_{2k+1} & c_{2k+2} \\ -c_{2k+2}^* & c_{2k+1}^* \end{bmatrix},$$

where the entries of the matrices $S_k$ and $S_{k-1}$ contain transmit symbols and the matrix $C_k$ contains information symbols at a time k.

One column of the transmit matrix in each case contains the transmit symbols which are successively sent or transmitted via an antenna. The two row vectors in the matrix $S_k$ are orthogonal to one another which provides for incoherent detection in the receiver. In contrast to the coherent detection, the incoherent detection is not dependent on a radio channel estimation and no training sequences are thus required at the transmitting end.

When two antennas are used at the transmitting end, two previously known symbols must be transmitted correspondingly before the data transmission, for the initialization of the radio transmission and for the decoding at the receiving end, respectively.

FIG. 1 shows a radio transmission with "Differential Space Time Block Code, DSTBC" in an OFDM radio communication system with two antennas at the transmitting end. In this arrangement, symbols s are series/parallel converted, DSTBC-coded, mapped onto N subcarriers and transmitted orthogonally with respect to one another via two transmitting antennas.

FIG. 2 shows, with reference to FIG. 1, the signaling overhead due to the initialization and the procedure in the differential coding (DSTBC) per subcarrier plotted over time. It can be seen that due to the coding by DSTBC a separate initialization is necessary for each subcarrier in the OFDM radio transmission. It can also be seen that, due to two transmitting antennas being used and due to the DSTBC, in each case two symbols are used per subcarrier for the initialization.

According to the 3GPP TR 25.814 standard, "Physical Layer Aspects for Evolved UTRA", Release 7, page 17, 2005-11, a maximum of seven symbols are located in a subframe of 500 µsec duration, with a subcarrier spacing of 15 kHz. In this case, the subcarrier spacing in an OFDM system is inversely proportional to the duration of an OFDM symbol and each OFDM symbol has a guard interval.

Due to the orthogonal symbol transmission and the DSTBC coding, the transmission of an OFDM symbol considered also determines the transmission of the next OFDM symbol following so that lastly only six of seven symbols are transmitted in a subframe. This is shown by way of example in FIG. 3.

Together with the initialization in a first OFDM symbol, the overhead amounts to a total of 33% with a 500 μsec subframe and a subcarrier spacing of 15 kHz—i.e. only 66% of the frame are used for a (payload) data transmission.

In the case where there is a number of subscribers, data are transmitted in time-division multiplex (e.g. with TDMA) in a frame, one subframe being allocated to each subscriber. This is shown in FIG. 4A.

If, as shown in FIG. 4B, only one common initialization is used at the beginning of a frame in the downlink in order to be able to reduce a total overhead, a subscriber T2 would have to additionally detect the data of a subscriber T1 in order to be able to incoherently detect data intended for him. If power control is used, this may lead to subscriber T2 not receiving the data signal intended for subscriber T1 in sufficient strength.

To make the differential coding more effective for the combination of MIMO antenna system and OFDM radio transmission, a so-called "Differential Space Time Frequency Block Code, DSTFBC" was presented in "Differential Space-Time-Frequency Transmit Diversity in OFDM" by G. Bauch, Proc. of International Symposium on Wireless Personal Multimedia Communications (WPMC), Yokosuka, Japan, October 2003, which can be used in the symbol coding.

At the core, this is coding by DSTBC, but transmit symbols are distributed not exclusively over time but also over frequency.

The entries of a transmit matrix $S_k$ are sent on a subcarrier in two successive OFDM symbols, the entries of the next matrix are sent on the next subcarrier in each case in the same two OFDM symbols.

FIG. 5 shows the principle of coding by DSTFBC, whilst FIG. 6 shows the resultant overhead for the initialization and the procedure in the differential coding DSTFBC over frequency and time.

For the initialization, the coding by DSTFBC only needs two data symbols on one subcarrier which are in each case sent out via both transmitting antennas according to FIG. 5.

This provides for a distinct reduction in overhead. From 256 subcarriers onward, the total overhead is only 0.1% with a subcarrier spacing of 15 kHz and with a temporal frame duration of 500 μsec. Thus, 99.9% of the frame are available for the data transmission. This corresponds to an increase by 49.5% compared with the coding by DSTBC described initially.

However, the coding by DSTFBC has the decisive disadvantage of poorer performance depending on the OFDM parameterization selected and/or the prevailing fluctuation characteristics of the mobile radio channel. In the case of strong frequency selectivity with respect to the subcarrier spacing and little time variance with respect to the symbol duration, the coding is poorer in the frequency direction than the coding over the time axis. The reason for this is that, for successful coding by DSTFBC, a mobile radio channel should be present which is constant within certain limits.

Although the characteristics of the mobile radio channel change slowly in time, the transfer function of the mobile radio channel exhibits a distinct frequency selectivity in the frequency domain which is due to the multipath propagation. The frequency selectivity is expressed in short, but very deep dips or nulls. At these points, the similarity of the channel of adjacent subcarriers required for the coding by DSTFBC in the frequency domain is given only very inadequately. This results in high bit error rates in the case of coding by DSTFBC in comparison with coding by DSTBC.

Independently of the OFDM parameterization, the above-mentioned channel characteristics occur, for example, typically in so-called broadband "fixed wireless access" systems in which, due to the wide bandwidth of the channel, a correspondingly high frequency selectivity can be expected and the transmitting and receiving stations do not move, or only from time to time.

SUMMARY

Described below is a method for coding symbols which are transmitted in an OFDM radio transmission via at least two transmitting antennas, in which a high payload data throughput is achieved with high noise immunity at the same time.

In the method, the coding by DSTBC and the coding by DSTFBC are combined with one another in order to obtain a type of "hybrid" coding combination of the two methods.

Due to the use of OFDM radio transmission, two embodiments or coding orders can be implemented:

In a first embodiment of the method, two adjacent symbols of a selected first subcarrier are used as initialization symbols for coding by DSTFBC in the subcarrier direction in an OFDM radio transmission which takes place via two transmitting antennas.

The two adjacent symbols of the first subcarrier, which was arbitrarily specified before, are used for coding symbols of other subcarriers, wherein the DSTFBC coding is carried out from the symbols of the first subcarrier onward in the subcarrier or frequency direction with the symbols of the adjacent subcarriers.

Each individual subcarrier thus has at two symbol positions two adjacent symbols which were formed by DSTFBC coding in dependence on the two symbols of the first subcarrier.

On each subcarrier, the two symbols formed by DSTFBC coding are used for the initialization for a coding by DSTBC, taking place in the time direction or symbol direction, which is carried out from a third symbol onward.

Using the method described below, the advantage of the high data throughput which results from the coding by DSTFBC, and the advantage of the improved bit error characteristics which result from the coding by DSTBC are combined with one another by "hybrid" combination of the two coding systems with one another.

Using the coding by DSTFBC results in a low initialization overhead and thus a high payload data throughput.

Additionally using the coding by DSTBC which occurs along the symbol or time axis advantageously eliminates or reduces frequency-selective dependences of the radio transmission channel from a third OFDM symbol onward.

In an advantageous second embodiment of the method, coding by DSTBC is carried out over a previously defined period, i.e. over a predetermined number of symbols. This takes place on a subcarrier, which was arbitrarily previously specified along the symbol or time axis, which generates dependences between temporarily adjacent symbols of the selected subcarrier.

This coding is followed by a coding by DSTFBC which in each case extends over two successive OFDM symbols along the frequency or subcarrier axis, respectively. For the initialization for the coding by DSTFBC, the symbols in each case obtained via the coding by DSTBC on the first subcarrier are used.

This approach can be used advantageously in the case of channel states which are typically not very frequency-selective but greatly time-variant. Channels having such characteristics occur, for example, in the radio link of high-speed trains. In this case there is generally a line-of-sight connection between transmitter and receiver, i.e. there is essentially only one propagation path and there is thus no significant frequency selectivity, the channel being very greatly variable in time.

Knowledge about the channel characteristics which exist either at the transmitter or receiver or which are obtained by estimation can be used for a decision for switching between the two approaches described.

The switching decision is signaled between transmitter, on the one hand, and receiver, on the other hand.

The channel characteristics can be obtained, for example, by estimation, knowing the speed of a mobile terminal.

In this context, it is possible to switch, in dependence on the channel characteristics, between the two embodiments described.

It is correspondingly possible to switch between the hybrid coding method of the first or second embodiment and a further coding method in dependence on the channel characteristics.

For example, the known DSTBC coding or DSTFBC coding can be used in each case by itself as further coding method, thus switching occurs between the hybrid combination of the coding methods to a single coding method. Correspondingly, known coding methods can be used as "further" coding method.

Advantageously, as robust as possible a modulation method can be used in both variants or embodiments for the transmission of the data symbols required for the initialization and for the transmission of the data symbols which are coded by DSTFBC in the first variant and used for the initialization for the DSTBC coding on the individual subcarriers, or which are coded by DSTBC in the second variant and used for the initialization of the DSTFBC coding in the subcarrier direction.

BPSK modulation is particularly suitable for this purpose in order to guarantee a robust transmission for the data required for the initialization.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a block diagram of a "Differential Space Time Block Code, DSTBC" for an OFDM radio transmission according to the related art, FIG. 2 is a graph with reference to FIG. 1 illustrating a signaling overhead with a coding with DSTBC, FIG. 6 is a graph with reference to FIG. 5 for DSTFBC a resultant initialization overhead and the procedure with DSTFBC coding, FIG. 7 is a block diagram of a basic representation of the method, and FIG. 8 is a graph with reference to FIG. 7 initialization and direction of the hybrid coding.

DETAILED DESCRIPTION OF THE PREFERRED EMBODIMENT

Figure 4B:
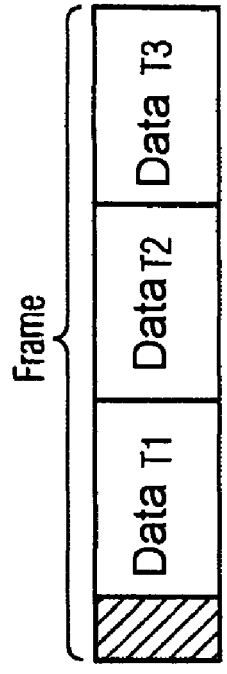
FIG. 4B is a data format diagram of a frame with data of three subscribers and a common initialization at the beginning according to the related art.

Reference will now be made in detail to the preferred embodiments, examples of which are illustrated in the accompanying drawings, wherein like reference numerals refer to like elements throughout.

Figure 3:
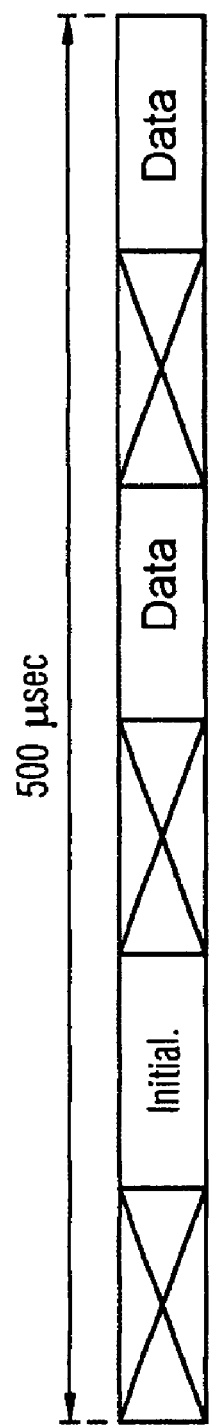
FIG. 3 is a data format diagram of an OFDM subframe according to the related art.
Figure 4A:
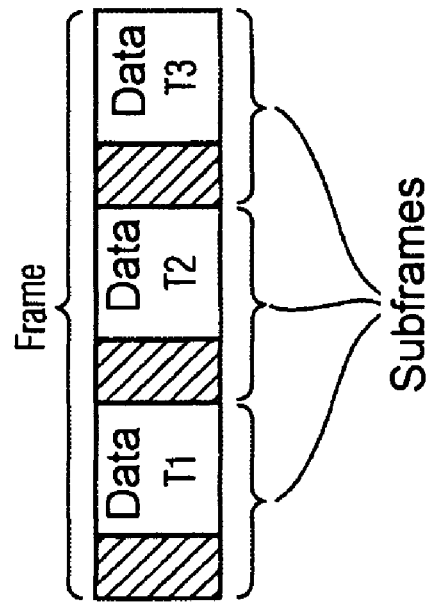
FIG. 4A is a data format diagram of a frame having three subframes in time-division multiplex according to the related art.
Figure 5:
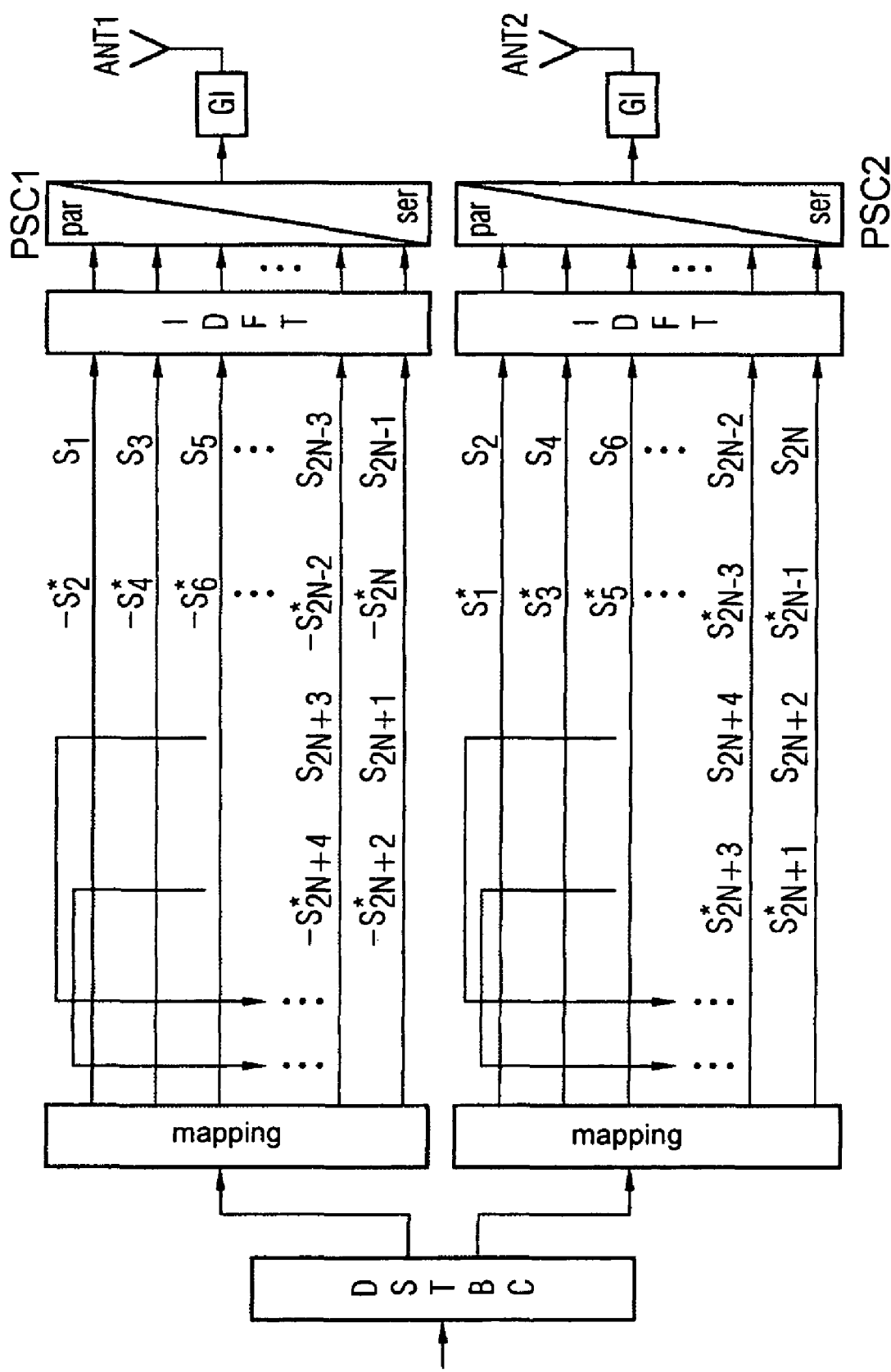
FIG. 5 is a block diagram of in a basic representation a coding by DSTFBC.

FIGS. 1 to 6 have already been explained in greater detail as related art in the introduction to the description.

FIG. 7 shows a basic representation of the method in a block diagram.

FIG. 8 shows with reference to FIG. 7 initialization and direction of the hybrid coding represented over frequency and time.

Two adjacent symbols SYM1 and SYM2 of a first subcarrier ST1 are provided for the initialization for a DSTFBC coding which takes place in the subcarrier direction. The two adjacent symbols SYM1 and SYM2 of the first subcarrier ST1 are used for the DSTFBC coding of similarly positioned symbols SYM1 and SYM2 of other subcarriers ST2, ST3, . . . , wherein the DSTFBC coding takes place from the symbols SYM1, SYM2 of the first subcarrier ST1 onward over the adjacent subcarriers ST2, ST3, . . . , in the subcarrier direction.

Lastly, each subcarrier ST1, ST2, ST3, . . . , has at two symbol positions t1 and t2 two adjacent symbols SYM1 and SYM2 which were formed by DSTFBC coding in dependence on the two adjacent symbols SYM1 and SYM2 of the first subcarrier ST1.

On each subcarrier, the two symbols SYM1, SYM2 formed by DSTFBC coding are used for the initialization for a DSTBC coding, taking place in the symbol direction or time direction, which is carried out from a third symbol SYM3 onward.

The initialization is carried out arbitrarily over the frequency axis and/or over the time axis. During the initialization phase of the DSTBC coding, data can be already advantageously transmitted.

Due to the orthogonal structure of the two codes, the DSTBC coding can use the first two OFDM symbols of the DSTFBC coding as a reference.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for coding data symbols transmitted in an orthogonal frequency division multiplex radio transmission via at least two transmitting antennas, comprising:

providing two first adjacent data symbols of a selected first subcarrier for initialization of differential space time frequency block code coding which takes place in a subcarrier direction;

using the two first adjacent data symbols of the selected first subcarrier for differential space time frequency block code coding of similarly positioned data symbols of other subcarriers, where the differential space time frequency block code coding takes place from the data symbols of the first subcarrier onward over adjacent subcarriers in the subcarrier direction, each subcarrier having at two symbol positions two further adjacent data symbols formed by differential space time frequency block code coding in dependence on the two first adjacent data symbols of the first subcarrier;

using on each other subcarrier the two further adjacent data symbols, formed by differ-ential space time frequency block code coding, for initialization of a differential space time block code coding, taking place in an orthogonal frequency division multiplex symbol direction, which is carried out from a third orthogonal frequency division multiplex data symbol onward, and using on the selected first subcarrier, the two first adjacent data symbols formed by differential space time frequency block code coding, for initialization of a differential space time block code coding, taking place in an orthogonal frequency division multiplex symbol direction, which is carried out from a third orthogonal frequency division multiplex data symbol onward.

2. The method as claimed in claim 1, further comprising using a robust modulation method for transmission of the data symbols required for the initialization and/or for transmission of the coded data symbols.

3. The method as claimed in claim 2, wherein binary phase shift key modulation is used as the robust modulation method.

4. The method as claimed in claim 3, further comprising switching between a two-stage coding method and another coding method in dependence on previously known or estimated radio channel characteristics.

5. The method as claimed in claim 2, further comprising switching between a two-stage coding method and another coding method in dependence upon previously known or estimated radio channel characteristics.

6. The method as claimed in claim 1, further comprising switching between a two-stage coding method and another coding method in dependence upon previously known or estimated radio channel characteristics.

7. A method for coding data symbols transmitted in an orthogonal frequency division multiplex radio transmission via at least two transmitting antennas, comprising:

differential space time block code coding, taking place in an orthogonal frequency division multiplex symbol direction, on a selected first subcarrier over a selected number of data symbols;

providing two first successive differential space time block code-coded data symbols of the selected first subcarrier for initialization of a differential space time frequency block code coding which takes place in a subcarrier direction;

using the two first successive differential space time block code-coded data symbols of the selected first subcarrier for the differential space time frequency block code coding of similarly positioned data symbols of other subcarriers, where the differential space time frequency block code coding takes place from the two first successive differential space time block code-coded data symbols of the selected first subcarrier onward over adjacent subcarriers in the subcarrier direction, so that each subcarrier has at two symbol positions two adjacent data symbols which were formed by differential space time frequency block code coding in dependence on the two first successive data symbols of the selected first subcarrier, and using on each subcarrier, the two adjacent data symbols, formed by differential space time frequency block code coding, for initialization of a differential space time block code coding, taking place in an orthogonal frequency division multiplex symbol direction, which is carried out from a third orthogonal frequency division multiplex data symbol onward.

8. The method as claimed in claim 7, further comprising using a robust modulation method for transmission of the data symbols required for the initialization and/or for transmission of the coded data symbols.

9. The method as claimed in claim 8, wherein binary phase shift key modulation is used as the robust modulation method.

10. The method as claimed in claim 9, further comprising switching between a two-stage coding method and another coding method in dependence on previously known or estimated radio channel characteristics.

11. The method as claimed in claim 8, further comprising switching between a two-stage coding method and another coding method in dependence upon previously known or estimated radio channel characteristics.

12. The method as claimed in claim 7, further comprising switching between a two-stage coding method and another coding method in dependence upon previously known or estimated radio channel characteristics.

* * * * *